United States Patent [19]

Schroeder et al.

[11] Patent Number: 5,175,260

[45] Date of Patent: Dec. 29, 1992

[54] DISAZO DYES WITH HYDROXYSULFONYLNAPHTHALENE COUPLING COMPONENTS

[75] Inventors: Gunter-Rudolf Schroeder, Heidelberg; Udo Mayer, Frankenthal, both of Fed. Rep. of Germany

[73] Assignee: BASF Aktiengesellschaft, Ludwigshafen, Fed. Rep. of Germany

[21] Appl. No.: 742,019

[22] Filed: Aug. 8, 1991

[30] Foreign Application Priority Data

Sep. 8, 1990 [DE]  Fed. Rep. of Germany ....... 4028630

[51] Int. Cl.⁵ ................... C09B 31/08; C09B 44/08; C09D 11/02; C09D 11/16
[52] U.S. Cl. ................... 534/604; 534/589; 534/606; 534/614; 534/628; 534/637; 534/728; 534/763; 534/834; 534/836; 534/837; 534/583; 534/801; 106/22 K; 106/23 K
[58] Field of Search ............. 534/763, 614, 604, 637, 534/606, 834, 836, 628, 837, 728, 801

[56] References Cited

U.S. PATENT DOCUMENTS

| | | | |
|---|---|---|---|
| 3,020,272 | 2/1962 | Satori | 534/614 |
| 3,074,926 | 1/1963 | Satori | 534/614 |
| 3,148,181 | 9/1964 | Wallace et al. | 534/603 |
| 3,652,532 | 3/1972 | Blackwell | 534/834 |
| 3,836,518 | 9/1974 | Clark | 534/604 |
| 4,626,284 | 12/1986 | Ohta et al. | 106/22 |
| 4,656,256 | 4/1987 | Colberg et al. | 534/605 |
| 4,694,075 | 9/1987 | Colberg et al. | 534/604 |
| 4,752,337 | 6/1988 | Kunde | 106/22 |
| 4,873,319 | 10/1989 | Stingelin | 534/604 |

FOREIGN PATENT DOCUMENTS

| | | | |
|---|---|---|---|
| 66781 | 12/1982 | European Pat. Off. | 534/836 |
| 0324415 | 7/1989 | European Pat. Off. | 534/604 |
| 356080 | 2/1990 | European Pat. Off. | 534/836 |
| 3502693 | 7/1986 | Fed. Rep. of Germany | 534/756 |

*Primary Examiner*—Floyd D. Higel
*Attorney, Agent, or Firm*—Oblon, Spivak, McClelland, Maier & Neustadt

[57] ABSTRACT

Disazo dyes suitable for preparing inks have the formula

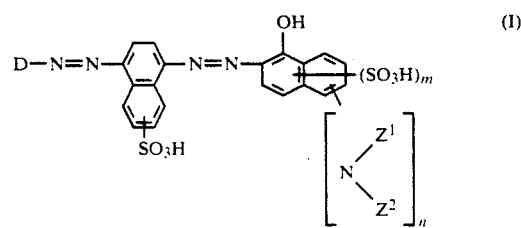

where
m is 1 or 2,
n is 0 or 1,
$Z^1$ is hydrogen or substituted or unsubstituted $C_1$-$C_4$-alkyl,
$Z^2$ is hydrogen, substituted or unsubstituted $C_1$-$C_4$-alkyl, $C_1$-$C_4$-alkanoyl, substituted or unsubstituted benzoyl, $C_1$-$C_4$-alkylsulfonyl, substituted or unsubstituted phenylsulfonyl or a derivatized 1,3,5-triazinyl radical, and
D is the radical of a diazo component of the class of the thiazole, thiophene, aminobenzoic acid or phenylenediamine compounds.

4 Claims, No Drawings

DISAZO DYES WITH HYDROXYSULFONYLNAPHTHALENE COUPLING COMPONENTS

The present invention relates to novel disazo dyes of the formula I

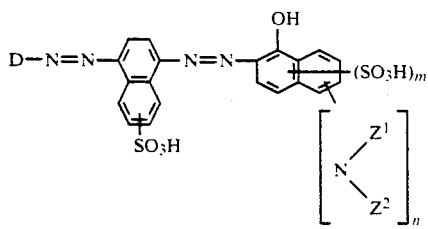

where
m is 1 or 2,
n is 0 or 1,
$Z^1$ is hydrogen or substituted or unsubstituted $C_1$–$C_4$-alkyl,
$Z^2$ is hydrogen, substituted or unsubstituted $C_1$–$C_4$-alkyl, $C_1$–$C_4$-alkanoyl, substituted or unsubstituted benzoyl, $C_1$–$C_4$-alkylsulfonyl, substituted or unsubstituted phenylsulfonyl or a radical of the formula

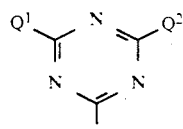

where $Q^1$ and $Q^2$ are identical or different and each is independently of the other halogen, amino, $C_1$–$C_4$-monoalkylamino, $C_1$–$C_4$-dialkylamino or phenylamino, and
D is the radical of a diazo component of the thiazole or thiophene series or a radical of the formula

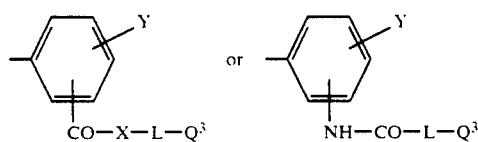

where
Y is hydrogen, substituted or unsubstituted $C_1$–$C_6$-alkyl, substituted or unsubstituted $C_1$–$C_6$-alkoxy, halogen or nitro,
X is oxygen, imino or $C_1$–$C_4$-alkylimino,
L is $C_1$–$C_6$-alkylene, and
$Q^3$ is a radical of the formula

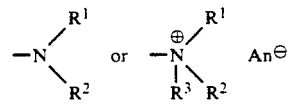

where $R^1$, $R^2$ and $R^3$ are identical or different and each is independently of the others hydrogen, $C_1$–$C_4$-alkyl or benzyl, or $R^1$ and $R^2$ together with the nitrogen atom joining them together are a 5-, 6- or 7-membered saturated or aromatic heterocyclic radical which may possess further hetero atoms, and $An^\ominus$ is an anion.

U.S. Pat. Nos. 4,752,337 and 4,626,284 disclose disazo dyes with a similar structure to those of the abovementioned formula I. However, their diazo component D-NH$_2$ is derived either from 2-hydroxy-4-aminobenzoic acid or from anilinesulfonic acid or p-phenylenediamine derivatives.

Furthermore, U.S. Pat. No. 4,694,075 describes disazo dyes whose diazo component is derived from anthranilic esters which contain a basic group within the alcoholic ester component. The coupling components used there are 1-aminonaphthalene and resorcinol.

It has been found, however, that such dyes have poor application properties.

It is an object of the present invention to provide novel disazo dyes which are usable with advantage for preparing inks, in particular inks for the ink jet process.

We have found that this object is achieved by the disazo dyes of the formula I defined in more detail at the beginning.

Any alkyl or alkylene appearing in the abovementioned formula I may be either straight-chain or branched.

Any substituted alkyl appearing in the abovementioned formula I may have as substituents for example phenyl, $C_1$–$C_4$-alkoxy or cyano.

Any substituted phenyl appearing in the abovementioned formula I may have as substituents for example $C_1$–$C_4$-alkyl, $C_1$–$C_4$-alkoxy, halogen, in particular chlorine or bromine, or $C_1$–$C_4$-dialkylamino, in particular $C_1$–$C_4$-dialkylamino in ring position 4.

$Z^1$, $Z^2$, Y, $R^1$, $R^2$ and $R^3$ are each for example methyl, ethyl, propyl, isopropyl, butyl, isobutyl or sec-butyl.

$Z^1$, $Z^2$ and Y may each also be for example benzyl, 1- or 2-phenylethyl, 2-cyanoethyl, 3-cyanopropyl, 4-cyanobutyl, 2-methoxyethyl, 2-ethoxyethyl, 2- or 3-methoxypropyl, 2- or 3-ethoxypropyl, 2- or 4-methoxybutyl or 2- or 4-ethoxybutyl.

Y may also be for example pentyl, isopentyl, neopentyl, tert-pentyl, hexyl, 2-methylpentyl, 5-cyanopentyl, 6-cyanohexyl, 5-methoxypentyl, 6-methoxyhexyl, methoxy, ethoxy, propoxy, isopropoxy, butoxy, isobutoxy, sec-butoxy, isopentyloxy, neopentyloxy, tert-pentyloxy, hexyloxy, benzyloxy, 1- or 2-phenylethoxy, 2-cyanoethoxy, 3-cyanopropoxy, 4-cyanobutoxy, 2-methoxyethoxy, 2-ethoxyethoxy, 2- or 3-methoxypropoxy, 2- or 3-ethoxypropoxy, 2- or 4-methoxybutoxy, 2- or 4-ethoxybutoxy, fluorine, chlorine or bromine.

$Z^2$ may also be for example formyl, acetyl, propionyl, butyryl, isobutyryl, benzoyl, 2- or 4-methylbenzoyl, 2- or 4-methoxybenzoyl, 2- or 4-chlorobenzoyl, 2- or 4-dimethylaminobenzoyl, methylsulfonyl, ethylsulfonyl, propylsulfonyl, isopropylsulfonyl, butylsulfonyl, phenylsulfonyl, 2- or 4-methoxyphenylsulfonyl, 2- or 4-chlorophenylsulfonyl or 2- or 4-dimethylaminophenylsulfonyl.

$Q^1$ and $Q^2$ are each for example fluorine, chlorine, bromine, mono- or dimethylamino, mono- or diethylamino, mono- or dipropylamino, mono- or diisopropylamino, monoor dibutylamino or N-methyl-N-ethylamino.

X is for example methylimino, ethylimino, propylimino, isopropylimino or butylimino.

L is for example methylene, ethylene, 1,2- or 1,3-propylene, isopropylidene, 1,2-, 1,3-, 2,3- or 1,4-butylene, 1,5-pentylene or 1,6-hexylene.

Suitable anions $An^\ominus$ are for example inorganic or organic anions, such as fluoride, chloride, bromide, iodide, acetate, mono-, di- or trichloroacetate, methanesulfonate, benzenesulfonate, toluenesulfonate, methosulfate and ethosulfate.

When $R^1$ and $R^2$ together with the nitrogen atom joining them together are a 5-, 6- or 7-membered saturated or aromatic heterocyclic radical which may contain further hetero atoms, it may be for example pyrrolidinyl, piperidinyl, morpholinyl, piperazinyl, N-($C_1$-$C_4$-alkyl)piperazinyl, such as N-methyl- or N-ethylpiperazinyl, pyrrolyl, imidazolyl, 3-($C_1$-$C_4$-alkyl)imidazol-1-ylium or pyridinium. The two last-mentioned radicals require the presence of the anion $An^\ominus$ as the counterion, $An^\ominus$ having the abovementioned meanings.

A diazo component D of the thiazole or thiophene series preferably has the formula II or III

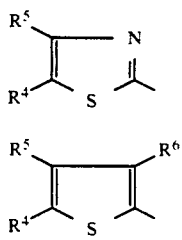

where $R^4$, $R^5$ and $R^6$ are identical or different and each is independently of the others hydrogen, substituted or unsubstituted $C_1$-$C_4$-alkyl, substituted or unsubstituted phenyl, cyano or $C_1$-$C_4$-alkoxycarbonyl, or $R^4$ and $R^5$ together are the radical of a fused benzo ring.

Suitable radicals $R^4$, $R^5$ and $R^6$ are for example methoxycarbonyl, ethoxycarbonyl, propoxycarbonyl, isopropoxycarbonyl, butoxycarbonyl, isobutoxycarbonyl, phenyl, 2-, 3- or 4-methylphenyl, 2-, 3- or 4-methoxyphenyl or 2-, 3- or 4-chlorophenyl. For further examples reference should be made to the previous enumerations.

Preference is given to disazo dyes which conform to the formula Ia

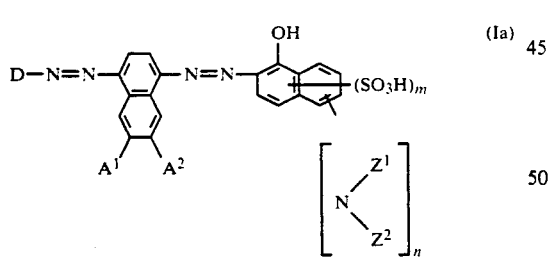

where
one of $A^1$ and $A^2$ is hydrogen and the other is hydroxysulfonyl and m, n, D, $Z^1$ and $Z^2$ are each as defined above.

Preference is further given to disazo dyes of the formula I where n is 1.

Particular preference is given to disazo dyes of the formula I where n is 1 and $Z^1$ is hydrogen, $C_1$-$C_4$-alkanoyl or benzoyl.

Particular preference is further given to disazo dyes of the formula where D is a) a radical of the formula II where $R^4$ and $R^5$ are each hydrogen or $R^4$ is $C_1$-$C_4$-alkoxycarbonyl and $R^5$ is $C_1$-$C_4$-alkyl, in particular methyl, b) a radical of the formula III where $R^4$ is $C_1$-$C_4$-alkoxycarbonyl, $R^5$ is $C_1$-$C_4$-alkyl, in particular methyl, and $R^6$ is cyano, or c) a radical of the formula

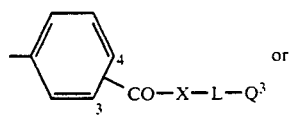

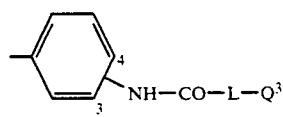

where the radical $-CO-X-L-Q^3$ or $-NH-CO-L-Q^3$ is in either case in ring position 3 or 4, X is oxygen or imino, L is $C_2$-$C_4$-alkylene, and $Q^3$ is $C_1$-$C_4$-dialkylamino or 3-($C_1$-$C_4$-alkyl)imidazol-1-ylium-$An^\ominus$, where $An^\ominus$ has the abovementioned meanings.

The novel disazo dyes of the formula I may be prepared in a conventional manner. For example, by diazotizing an amine of the formula IV $$D-NH_2 \qquad (IV)$$

where D is as defined above, and coupling with an aminonaphthalenesulfonic acid of the formula V

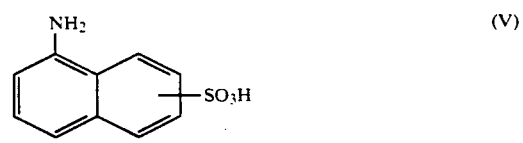

in a conventional manner.

The resulting monoazo dye of the formula VI

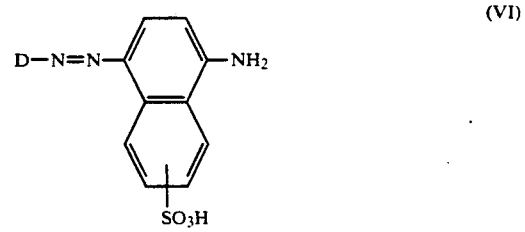

where D is as defined above, is then diazotized and coupled with a hydroxynaphthalene derivative of the formula VII

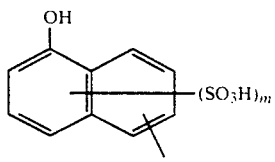

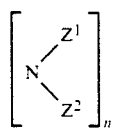

where n, m, $Z^1$ and $Z^2$ are each as defined above.

Those dyes of the formula I which contain a quaternary nitrogen atom in the radical D of the diazo component are customarily obtained from the corresponding neutral dyes by alkylation with customary alkylating agents or by reaction with nitrogen-containing heterocycles.

The dyes of the present invention are suitable in an advantageous manner for preparing inks, in particular inks for the ink jet process.

The ink jet process is known per se. It involves projecting droplets of a writing fluid from one or more small jets onto a substrate, for example paper, wood, textiles, plastics or metal, in a specific manner. Electronic control means gather the individual droplets together to form alphanumeric or graphic characters.

Recording fluids suitable for the ink jet process generally contain water and/or organic solvents as well as the colorant. Such jet inks are described for example in EP-A-324 415.

When used in inks for the ink jet process, the novel disazo dyes are notable for high color strengths and good water and smudge fastness.

The invention is explained in more detail in the following Examples:

EXAMPLE 1

5.2 g (0.025 mol) of 2-(N,N-dimethylamino)ethyl m-aminobenzoate were diazotized in a conventional manner with sodium nitrite in a medium acidified with hydrochloric acid and added to an alkaline solution of 5.58 g (0.025 mol) of 1-aminonaphthalene-6-sulfonic acid. The mixture was set to a pH of 3.5 and stirred at room temperature for 3 hours. The pH was then reduced with concentrated hydrochloric acid to 1.5 and the monoazo dye intermediate was not isolated but diazotized directly with 8.6 ml of 23% strength by weight aqueous sodium nitrite solution while cooling with ice. 10.58 g (0.025 mol) of 1-benzoylamino-8-hydroxynaphthalene-3,6-disulfonic acid, dissolved in 200 ml of water (at pH 6-7), were added to the diazonium salt solution, and the mixture was rapidly adjusted with sodium hydroxide solution to pH 10-11. After an hour the pH was lowered with hydrochloric acid to 1 and the dye was salted out with sodium chloride and filtered off. It was then dissolved with lithium hydroxide in water and demineralized by diafiltration. The solution was evaporated to dryness under reduced pressure. This left 14.9 g of a reddish black dye of the formula

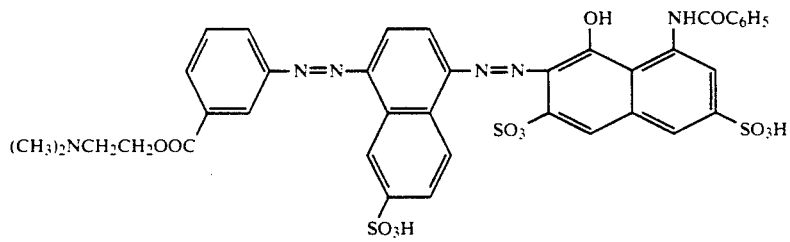

in the form of the lithium salt.

The same method can be used to obtain the disazo dyes listed in the following Tables 1 and 2:

TABLE 1

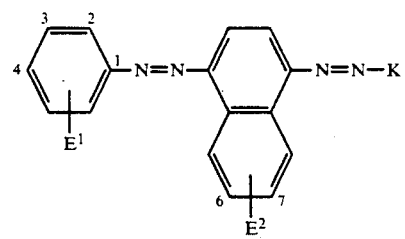

| Ex. No. | $E^1$ | $E^2$ | K | Hue |
|---------|-------|-------|---|-----|
| 2 | 3-COOC$_2$H$_4$N(CH$_3$)$_2$ | 7-SO$_3$H | 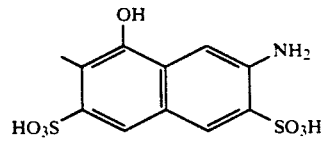 | black |

TABLE 1-continued

[Structure: phenyl-N=N-naphthyl(with E² at 6,7-position)-N=N-K, with E¹ substituent on phenyl ring]

| Ex. No. | E¹ | E² | K | Hue |
|---|---|---|---|---|
| 3 | 3-COOC₂H₄N(CH₃)₂ | 7-SO₃H | 8-amino-1-hydroxy-naphthalene-3,6-disulfonic acid derivative (OH, NH₂, HO₃S, SO₃H with CH₃) | black |
| 4 | 3-COOC₂H₄N(CH₃)₂ | 7-SO₃H | 1-amino-8-hydroxy-naphthalene-2,4-disulfonic acid derivative (OH, NH₂, SO₃H, SO₃H with CH₃) | black |
| 5 | 3-COOC₂H₄N(CH₃)₂ | 6-SO₃H | OH, NHCOC₆H₅, HO₃S, SO₃H naphthalene with CH₃ | reddish black |
| 6 | 3-COOC₂H₄N(CH₃)₂ | 7-SO₃H | OH, NHCOC₆H₅, HO₃S, SO₃H naphthalene with CH₃ | bluish black |
| 7 | 3-COOC₂H₄N(CH₃)₂ | 6-SO₃H | OH, NH₂, HO₃S, SO₃H naphthalene with CH₃ | black |
| 8 | 4-COOC₂H₄N(CH₃)₂ | 7-SO₃H | OH, NH₂, HO₃S, SO₃H naphthalene with CH₃ | black |
| 9 | 4-CONHC₃H₆N(CH₃)₂ | 7-SO₃H | OH, NH₂, HO₃S, SO₃H naphthalene with CH₃ | bluish black |
| 10 | 4-CONHC₂H₄N(C₂H₅)₂ | 7-SO₃H | OH, NH₂, HO₃S, SO₃H naphthalene with CH₃ | black |

TABLE 1-continued

| Ex. No. | E¹ | E² | K | Hue |
|---|---|---|---|---|
| 11 | 3-CONHC₂H₄N(CH₃)₂ | 7-SO₃H | (OH, NH₂, HO₃S, SO₃H naphthalene) | black |
| 12 | 4-CONHC₂H₄N(CH₃)₂ | 7-SO₃H | (OH, NH₂, HO₃S, SO₃H naphthalene) | blue |
| 13 | 4-CONHC₂H₄N(C₂H₅)₂ | 7-SO₃H | (OH, NH₂, HO₃S, SO₃H naphthalene) | blue |
| 14 | 3-CONHC₂H₄N(C₂H₅)₂ | 7-SO₃H | (OH, NH₂, HO₃S, SO₃H naphthalene) | bluish black |
| 15 | 4-CONHC₂H₄N(CH₃)₂ | 7-SO₃H | (OH, NH₂, HO₃S, SO₃H naphthalene) | bluish black |
| 16 | 3-COOC₂H₄N(CH₃)₂ | 7-SO₃H | (OH, NHCOC₆H₅, HO₃S, SO₃H naphthalene) | bluish black |
| 17 | 3-COOC₂H₄N(CH₃)₂ | 7-SO₃H | (OH, NHCOCH₃, HO₃S, SO₃H naphthalene) | gray |
| 18 | 3-COOC₂H₄N(CH₃)₂ | 7-SO₃H | (OH, HO₃S, NHCH₃ naphthalene) | black |

TABLE 1-continued

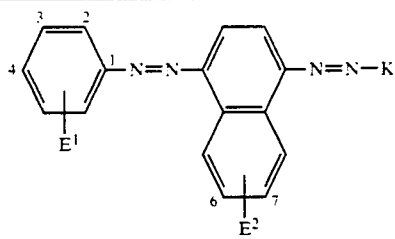

| Ex. No. | $E^1$ | $E^2$ | K | Hue |
|---|---|---|---|---|
| 19 | 4-NHCOC$_2$H$_4$—N$^⊕$=N—CH$_3$  CH$_3$COO$^⊖$ | 7-SO$_3$H | (OH, NH$_2$, HO$_3$S, SO$_3$H naphthol) | black |

TABLE 2

(structure: D—N=N—naphthalene(SO$_3$H)—N=N—naphthalene(OH, NH$_2$, HO$_3$S, SO$_3$H))

| Ex. No. | D | Hue |
|---|---|---|
| 20 | (CH$_3$)$_2$NC$_2$H$_4$OOC—C$_6$H$_4$(CH$_3$)— | black |
| 21 | H$_3$C, H$_5$C$_2$OOC-thiazole | black |
| 22 | H$_3$C, CN, H$_3$COOC-thiophene | blue |

EXAMPLE 23 (use)

3 g of the dye of Example 1 were dissolved in 90 ml of water and 10 ml of N-methylpyrrolidinone. The solution was pressure filtered through a Teflon filter of pore size 1 μm and then devolatilized under reduced pressure.

This recording fluid was introduced into the reservoir vessel of an ink jet printing head which expels the ink in droplets under the influence of supplied heat. This thermal ink jet printing head was used to print on commercial paper of the type used for typewriting. The prints were notable for good water and smudge fastness.

We claim:
1. A diazo dye of the formula

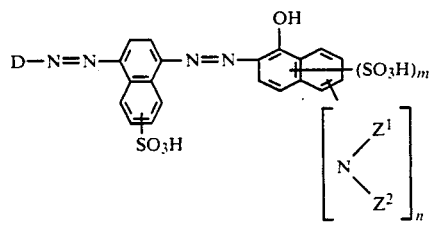

where
m is 1 or 2,
n is 0 or 1,
$Z^1$ is hydrogen, $C_1$-$C_4$-alkyl, or $C_1$-$C_4$-alkyl substituted by phenyl, $C_1$-$C_4$-alkoxy or cyano,
$Z^2$ is hydrogen, $C_1$-$C_4$-alkyl, $C_1$-$C_4$-alkyl substituted by phenyl, $C_1$-$C_4$-alkoxy or cyano, $C_1$-$C_4$-alkanoyl, $C_1$-$C_4$-alkanoyl substituted by phenyl, $C_1$-$C_4$-alkoxy or cyano, benzoyl, benzoyl substituted by $C_1$-$C_4$-alkyl, $C_1$-$C_4$-alkoxy, halogen or $C_1$-$C_4$-dialkylamino, $C_1$-$C_4$-alkylsulfonyl, phenylsulfonyl, phenylsulfonyl substituted by $C_1$-$C_4$-alkyl, $C_1$-$C_4$-alkoxy, halogen or $C_1$-$C_4$-dialkylamino, or a radical of the formula

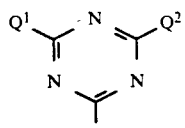

where $Q^1$ and $Q^2$ are identical or different and each is independently of the other halogen, amino, $C_1$-$C_4$-monoalkylamino, $C_1$-$C_4$-dialkylamino or phenylamino, and
D is a thiazole or thiophene diazo component or a radical of the formula

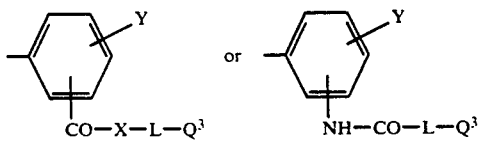

Y is hydrogen, $C_1$-$C_6$-alkyl, $C_1$-$C_6$-alkyl substituted by phenyl, $C_1$-$C_4$-alkoxy or cyano, $C_1$-$C_4$- alkoxy, C$_1$-C$_6$-alkoxy substituted by phenyl, C$_1$-C$_4$-alkoxy or cyano, halogen or nitro, X is oxygen, imino or C$_1$-C$_4$-alkylimino, L is C$_1$-C$_6$-alkylene, and Q$^3$ is a radical of the formula

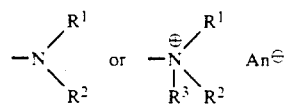

where R$^1$, R$^2$ and R$^3$ are identical or different and each is independently of the others hydrogen, C$_1$-C$_4$-alkyl or benzyl, or R$^1$ and R$^2$ together with the nitrogen atom joining them together are pyrrolidinyl, piperidinyl, morpholinyl, piperazinyl, N-(C$_1$-C$_4$-alkyl) piperazinyl, imidazolyl, 3-(C$_1$-C$_4$-alkyl) imidazol-1-ylium or pyridinium group, and An$^\ominus$ is an anion.

2. A diazo dye as claimed in claim 1, conforming to the formula

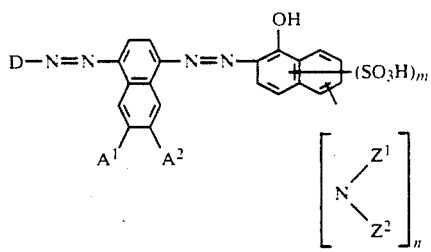

where
one of A$^1$ and A$^2$ is hydrogen and the other is hydroxysulfonyl and m, n, D, Z$^1$ and Z$^2$ are each as defined in claim 1.

3. A diazo dye as claimed in claim 1, wherein n is 1.

4. A diazo dye as claimed in claim 1, wherein D has the formula

wherein R$^4$, R$^5$ and R$^6$ are identical or different and each is independently of the others hydrogen, C$_1$-C$_4$-alkyl, C$_1$-C$_4$-alkyl substituted by phenyl, C$_1$-C$_4$-alkoxy or cyano, phenyl, phenyl substituted by C$_1$-C$_4$-alkyl, C$_1$-C$_4$-alkoxy, halogen or C$_1$-C$_4$-dialkylamino, cyano or C$_1$-C$_4$-alkoxycarbonyl, or R$^4$ and R$^5$ together are the radical of a fused benzo ring.

* * * * *